United States Patent
Lee

(10) Patent No.: US 11,459,100 B2
(45) Date of Patent: Oct. 4, 2022

(54) DRONE TAKEOFF AND LANDING SYSTEM

(71) Applicant: KOREA AEROSPACE RESEARCH INSTITUTE, Daejeon (KR)

(72) Inventor: Seon Ho Lee, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 747 days.

(21) Appl. No.: 16/348,672

(22) PCT Filed: Dec. 5, 2017

(86) PCT No.: PCT/KR2017/014115
§ 371 (c)(1),
(2) Date: May 9, 2019

(87) PCT Pub. No.: WO2018/110883
PCT Pub. Date: Jun. 21, 2018

(65) Prior Publication Data
US 2019/0276147 A1 Sep. 12, 2019

(30) Foreign Application Priority Data
Dec. 13, 2016 (KR) .......................... 10-2016-0169429

(51) Int. Cl.
*B64C 39/02* (2006.01)
*B60L 53/12* (2019.01)
(Continued)

(52) U.S. Cl.
CPC ............ *B64C 39/024* (2013.01); *B60L 53/12* (2019.02); *B60L 53/31* (2019.02); *B60L 53/38* (2019.02); *B64C 39/02* (2013.01); *E01F 3/00* (2013.01); *B60L 2200/10* (2013.01); *B64C 2201/042* (2013.01); *B64C 2201/066* (2013.01);
(Continued)

(58) Field of Classification Search
CPC .... B64C 2201/066; B64F 1/007; B60L 53/12; B60L 53/38; B60L 53/31; B60L 2200/10
See application file for complete search history.

(56) References Cited

U.S. PATENT DOCUMENTS

| 2012/0061508 | A1 | 3/2012 | De Viry et al. |
| 2018/0370653 | A1* | 12/2018 | Fujita ...................... B64F 1/007 |

FOREIGN PATENT DOCUMENTS

| CN | 103545857 A | * | 1/2014 | ............ H02J 7/0044 |
| CN | 204383743 U | | 6/2015 |
(Continued)

OTHER PUBLICATIONS

European Search Report dated Oct. 28, 2020 in EP Application No. 17881158.4.
(Continued)

*Primary Examiner* — Timothy D Collins
*Assistant Examiner* — Justin Michael Heston
(74) *Attorney, Agent, or Firm* — Occhiuti & Rohlicek LLP

(57) ABSTRACT

A drone takeoff and landing system according to an embodiment comprises: a drone including a through-hole; and a landing pad including an extension member which can pass through the through-hole, wherein, when the extension member of the landing pad passes through the through-hole of the drone, an eddy current may occur between the through-hole and the extension member to cause magnetic braking of the drone.

8 Claims, 17 Drawing Sheets

(51) Int. Cl.
  *B60L 53/31* (2019.01)
  *B60L 53/38* (2019.01)
  *E01F 3/00* (2006.01)
(52) U.S. Cl.
  CPC .. *B64C 2201/088* (2013.01); *B64C 2201/146* (2013.01); *B64C 2201/20* (2013.01)

(56) References Cited

FOREIGN PATENT DOCUMENTS

| CN | 105416585 A | 3/2016 | | |
|---|---|---|---|---|
| CN | 105667768 A | 6/2016 | | |
| EP | 2974958 A2 | 1/2016 | | |
| KR | 20150068190 | 6/2015 | | |
| KR | 101571161 | 11/2015 | | |
| KR | 20160009446 | 1/2016 | | |
| KR | 101617594 | 5/2016 | | |
| WO | WO2016/137982 | 9/2016 | | |
| WO | WO-2016137982 A1 * | 9/2016 | ........... | B64C 39/024 |
| WO | WO-2017145485 A1 * | 8/2017 | ............. | B64C 27/08 |

OTHER PUBLICATIONS

Chinese Office Action dated Aug. 27, 2020 in CN Application No. 201780071247.4.

* cited by examiner

DRONE TAKEOFF AND LANDING SYSTEM

CROSS-REFERENCE TO RELATED APPLICATIONS

This application is the national phase under 35 USC 371 of international application no. PCT/KR2017/014115, filed Dec. 5, 2017, which claims the benefit of the priority date of Korean application no. 10-2016-0169429, filed Dec. 13, 2016. The contents of the aforementioned applications are incorporated herein by reference in their entireties.

TECHNICAL FIELD

Example embodiments relate to a drone takeoff and landing system.

BACKGROUND ART

A drone refers to an unmanned aerial vehicle or a helicopter-shaped flying vehicle that flies or steers through induction of radio waves without a human pilot or operator, and is initially used for military purposes. A drone is currently used for commercial purposes, in addition to the military purposes. Thus, research has been actively conducted on drones to be used for such various purposes.

As a demand for drones grows, a need for a landing gear capable of accommodating and transporting a plurality of drones at once is thus increasing. However, due to a shortage of a space accommodating the drones, a probability of a collision among the drones is also increasing.

Thus, there is a desire for a system that may prevent such a collision among the drones, and accommodate and transport the drones safely.

For example, the US Patent Publication No. 2012-0061508 entitled "Device for Firing Weapons from an Armed Drone" published in Mar. 15, 2012, discloses a drone.

DISCLOSURE OF INVENTION

Technical Goals

An aspect provides a drone takeoff and landing system that may prevent a collision between drones when the drones land on a landing stand, and prevent a collision between drones without being affected when power of a drone is blocked.

An aspect also provides a drone takeoff and landing system that may accommodate a plurality of drones and facilitate takeoff, landing, and transportation of the drones.

An aspect also provides a drone takeoff and landing system that may adjust a takeoff or landing speed of a drone, thereby enabling the drone to take off fast from a landing stand and land softly on the landing stand, and also enabling the drone to be wirelessly charged while the drone is resting on the landing stand.

An aspect also provides a drone takeoff and landing system that may generate an eddy current or a magnetic field between a drone and a landing stand and adjust a takeoff or landing speed of the drone, thereby enabling the drone to take off fast from the landing stand and land softly on the landing stand.

An aspect also provides a drone takeoff and landing system that may generate an eddy current or a magnetic field between a drone and a landing stand, thereby enabling the drone to be wirelessly charged while the drone is resting on the landing stand.

An aspect also provides a drone takeoff and landing system that may include a landing module attachable to or detachable from an existing drone and a landing stand, thereby achieving same effects as described above from the existing drone without a through-hole in a main body of the existing drone.

Technical Solutions

According to an example embodiment, there is provided a drone takeoff and landing system including a drone including a through-hole, and a landing stand including an extension member configured to pass through the through-hole. When the extension member of the landing stand passes through the through-hole of the drone, an eddy current may be generated between the through-hole and the extension member, and magnetic braking may occur in the drone.

A magnetic body may be disposed on a surface of the through-hole, and the extension member may be formed as a nonferrous conductor or include a nonferrous conductor element provided on a surface of the extension member. The eddy current may be generated between the magnetic body and the nonferrous conductor.

A nonferrous conductor element may be disposed on the surface of the through-hole, and a magnetic body may be disposed on the surface of the extension member. The eddy current may be generated between the magnetic body and the nonferrous conductor element.

The drone may include a main body including the through-hole, and a thruster provided outside the main body. The landing stand may include a landing pad, on one surface of which the extension member having a column shape is provided.

The drone takeoff and landing system may include a plurality of drones. A length of the extension member may be set to be greater than a total height of the drones. The extension member may pass through respective through-holes of the drones, and the drones may be stacked in sequential order on the landing stand.

The landing stand may further include a cover provided on the landing pad to protect the drones stacked on the landing stand.

The through-hole may be formed as a plurality of through-holes. The extension member may be provided in a number corresponding to the number of the through-holes.

The drone takeoff and landing system may include the drone including the through-hole, and the landing stand including the extension member configured to pass through the through-hole. A first electromagnet may be disposed in the through-hole, and a second electromagnet may be disposed in the extension member. A magnetic field of the first electromagnet and the second electromagnet may be controlled to control a takeoff or landing speed of the drone or wirelessly charge the drone.

Each of the first electromagnet and the second electromagnet may be disposed to form a radial magnetic field in a direction vertical to a length direction of the through-hole and the extension member, respectively. A polarity of the first electromagnet and the second electromagnet may be controlled to increase the takeoff speed of the drone when the drone takes off from the landing stand, or to decrease the landing speed of the drone when the drone lands on the landing stand. The drone may be wirelessly charged by magnetic induction between the first electromagnet and the second electromagnet.

Each of the first electromagnet and the second electromagnet may be disposed to form an axial magnetic field in a direction horizontal to the length direction of the through-hole and the extension member, respectively. The polarity of the first electromagnet and the second electromagnet may be controlled to increase the takeoff speed of the drone when the drone takes off from the landing stand, or to decrease the landing speed of the drone when the drone lands on the landing stand. The drone may be wirelessly charged by magnetic induction between the first electromagnet and the second electromagnet.

According to a modified example embodiment, there is provided a drone takeoff and landing system including a drone including a through-hole, and a landing stand including a landing pad and an extension member provided on one surface of the landing pad and configured to pass through the through-hole. The through-hole may be formed on a side surface of a main body of the drone such that one surface of the through-hole is opened in a direction towards an outside of the main body. The extension member of the landing stand may be configured to move vertically from the landing pad, and configured to move selectively upwards or downwards when the drone takes off or lands.

The through-hole may be formed as a plurality of through-holes, and the extension member may be provided in a number corresponding to the number of the through-holes.

When the extension member may pass through the through-hole of the drone, an eddy current may be generated between the through-hole and the extension member, and magnetic braking or wireless charging may occur in the drone.

A magnetic body or an electromagnet may be disposed in the through-hole, and a nonferrous conductor may be disposed in the extension member. The eddy current may be generated between the magnetic body or the electromagnet, and the nonferrous conductor.

A nonferrous conductor may be disposed in the through-hole, and a magnetic body or an electromagnet may be disposed in the extension member. The eddy current may be generated between the magnetic body or the electromagnet, and the nonferrous conductor.

A first electromagnet may be disposed in the through-hole, and a second electromagnet may be disposed in the extension member. A magnetic field of the first electromagnet and the second electromagnet may be controlled to control a takeoff or landing speed of the drone or wirelessly charge the drone.

According to another example embodiment, there is provided a drone takeoff and landing system including a landing module attachable to or detachable from a drone and including a through-hole, and a landing stand including a landing pad and an extension member provided on one surface of the landing pad and configured to pass through the through-hole.

The landing module may include a plurality of pass-through members each including a through-hole, and a connection member configured to connect the pass-through members and attachable to and detachable from the drone.

In a case in which the landing module is attached to the drone, an eddy current or a magnetic field may be generated between the through-hole and the extension member when the extension member passes through the through-hole, to control a speed of the drone or wirelessly charge the drone.

The connection member may be formed of an elastic material such that a length thereof is adjustable, or a length of the connection member may be adjustable through screw tightening.

A magnetic body or an electromagnet may be disposed in one of the through-hole and the extension member, and a nonferrous conductor may be disposed in the other. The eddy current may be generated between the magnetic body or the electromagnet, and the nonferrous conductor, and magnetic braking or wireless charging may occur in the drone.

A first electromagnet may be disposed in the through-hole, and a second electromagnet may be disposed in the extension member. A magnetic field of the first electromagnet and the second electromagnet may be controlled to control a takeoff or landing speed of the drone or wirelessly charge the drone.

Advantageous Effects

According to an example embodiment described herein, a drone takeoff and landing system may prevent a collision between drones when the drones land on a landing stand, and prevent a collision between drones without being affected when power of a drone is blocked.

The drone takeoff and landing system may accommodate a plurality of drones, and facilitate takeoff, landing, and transportation of the drones.

The drone takeoff and landing system may adjust a takeoff or landing speed of a drone, and thus enable the drone to take off fast from a landing stand and land softly on the landing stand, and also enable the drone to be wirelessly charged while the drone is resting on the landing stand.

In an example, the drone takeoff and landing system may generate an eddy current or a magnetic field between a drone and a landing stand and adjust a takeoff or landing speed of the drone, and thus may enable the drone to take off fast from the landing stand and land softly on the landing stand.

In another example, the drone takeoff and landing system may generate an eddy current or a magnetic field between a drone and a landing stand, and thus enable the drone to be wirelessly charged while the drone is resting on the landing stand.

According to another example embodiment described herein, a drone takeoff and landing system may include a landing module attachable to or detachable from an existing drone and a landing stand, thereby achieving same effects as described above from the existing drone without a through-hole in a main body of the existing drone.

BEST MODE FOR CARRYING OUT THE INVENTION

Figure 1A:
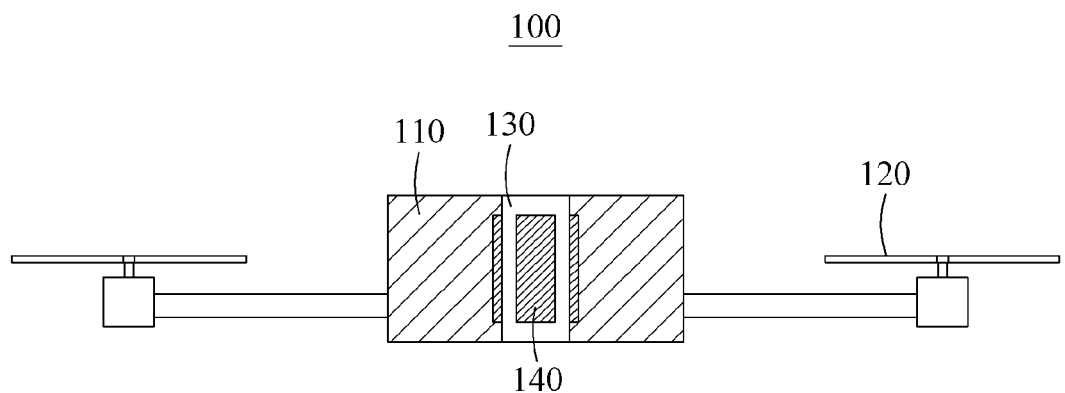
FIGS. 1a and 1b illustrate a drone according to an example embodiment.

Hereinafter, some example embodiments will be described in detail with reference to the accompanying drawings. The example embodiments are described in the following detailed description. Regarding the reference numerals assigned to the elements in the drawings, it should be noted that the same elements will be designated by the same reference numerals, wherever possible, even though they are shown in different drawings.

Also, in the description of the example embodiments, detailed description of well-known related structures or functions will be omitted when it is deemed that such description will cause ambiguous interpretation of the present disclosure.

The terms used herein are not to be interpreted based solely on the terms themselves, but to be interpreted based on the meanings of the terms as defined herein and the overall context of the present disclosure. In addition, the terms may need to be construed as corresponding to technical features or inventive concept described in the first example embodiment based on what an inventor(s) defines each of the terms.

Thus, the terms used herein should be construed as corresponding to technical features or inventive concept of a drone takeoff and landing system according to an example embodiment.

It should be understood that there is no intent to limit the present disclosure to a particular example embodiment disclosed. The examples and illustrated configurations are provided merely as a desirable example of a drone takeoff and landing system according to an example embodiment, and not represent all the technical features or inventive concept of the drone takeoff and landing system. Thus, various changes, modifications, and equivalents of the methods, apparatuses, and/or systems described herein will be apparent after an understanding of the present disclosure.

Figure 1B:
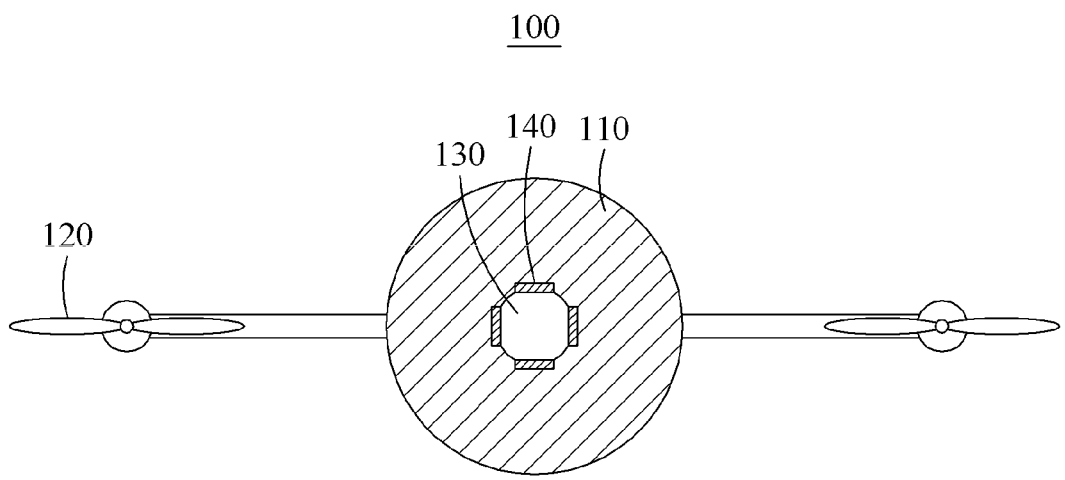
Figure 2A:
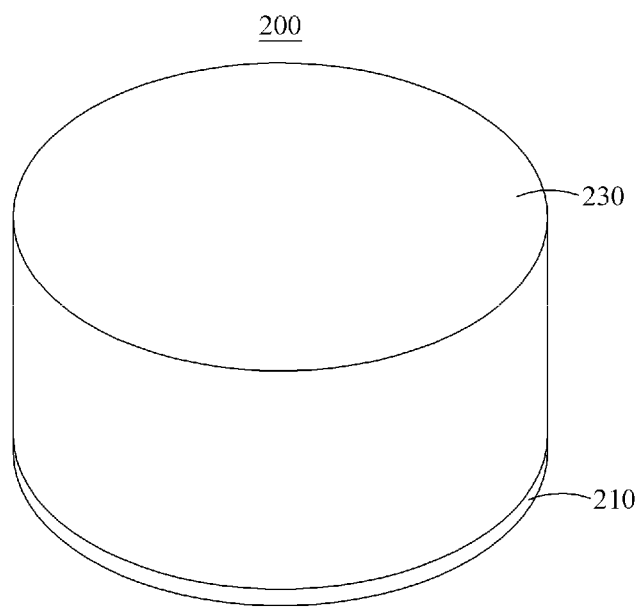
FIGS. 2a and 2b illustrate a landing stand according to an example embodiment.
Figure 2B:
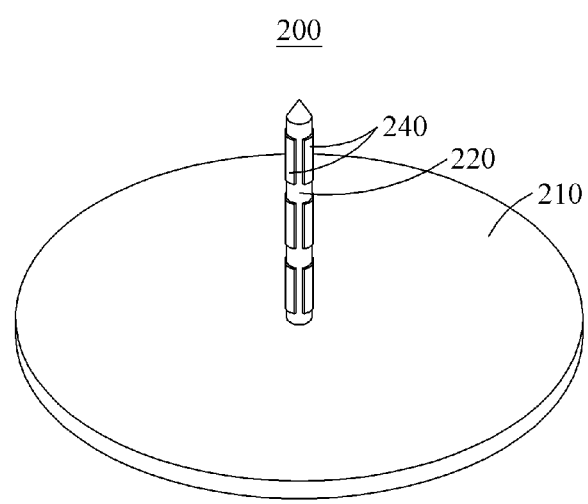
Figure 3:
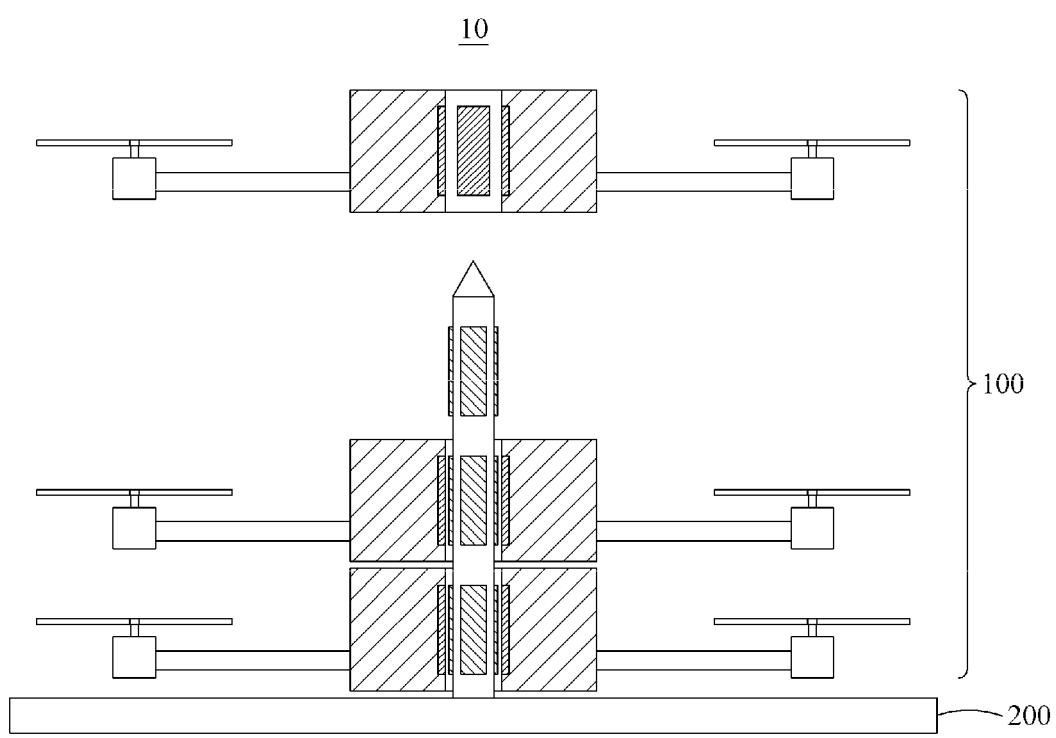
FIG. 3 illustrates a drone takeoff and landing system according to an example embodiment.
Figure 4:
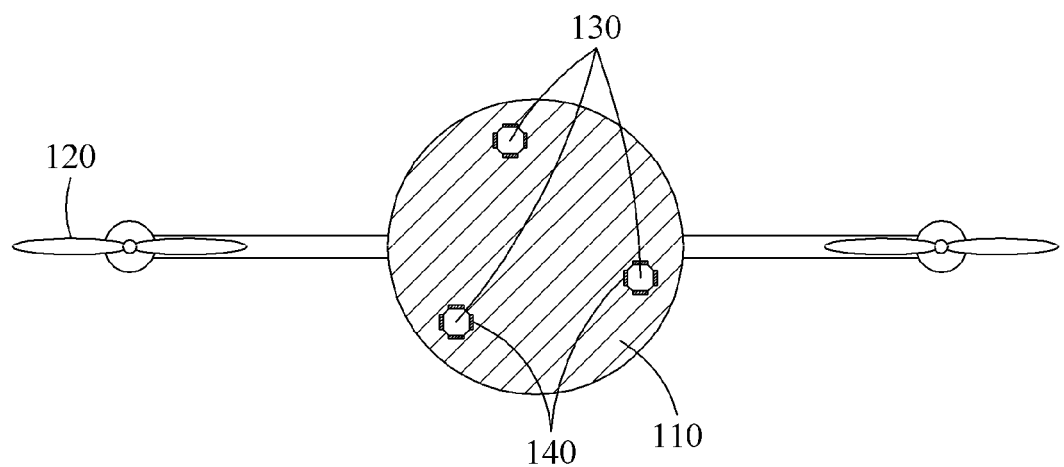
FIGS. 4 and 5 illustrate a drone takeoff and landing system including a plurality of through-holes and a plurality of extension members according to an example embodiment.
Figure 5:
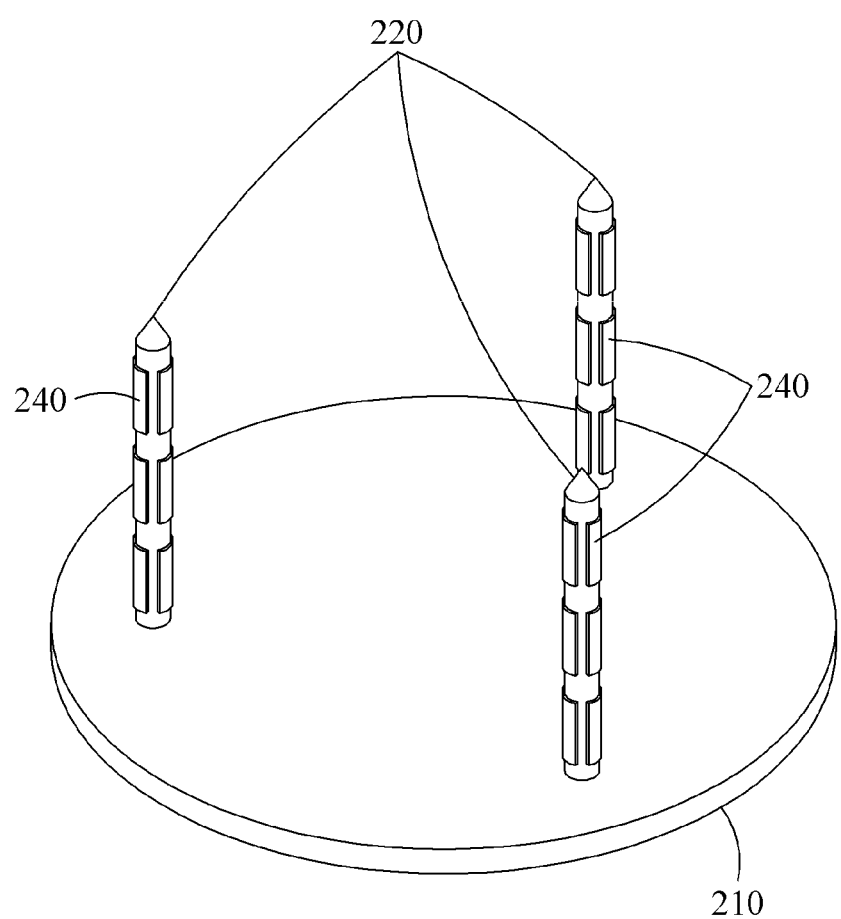
Figure 6A:
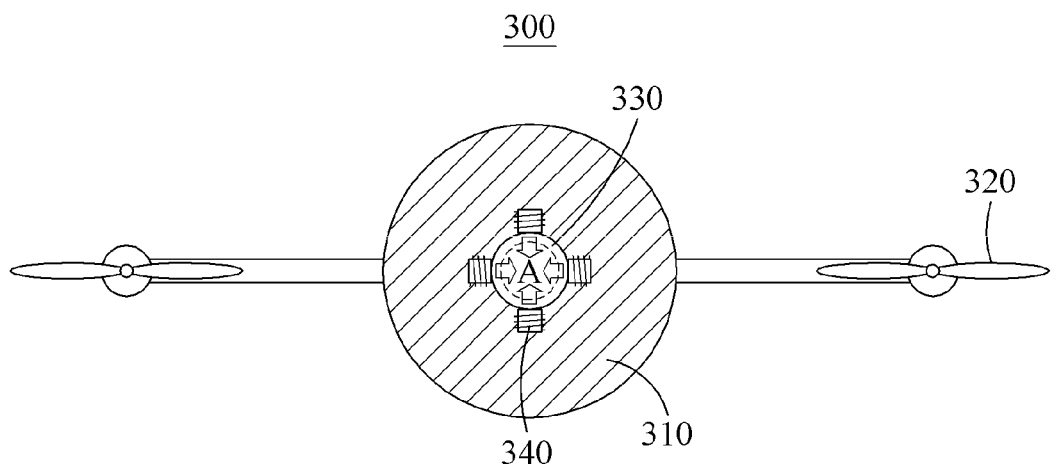
FIGS. 6a and 6b illustrate a drone forming a radial magnetic field according to an example embodiment.
Figure 6B:
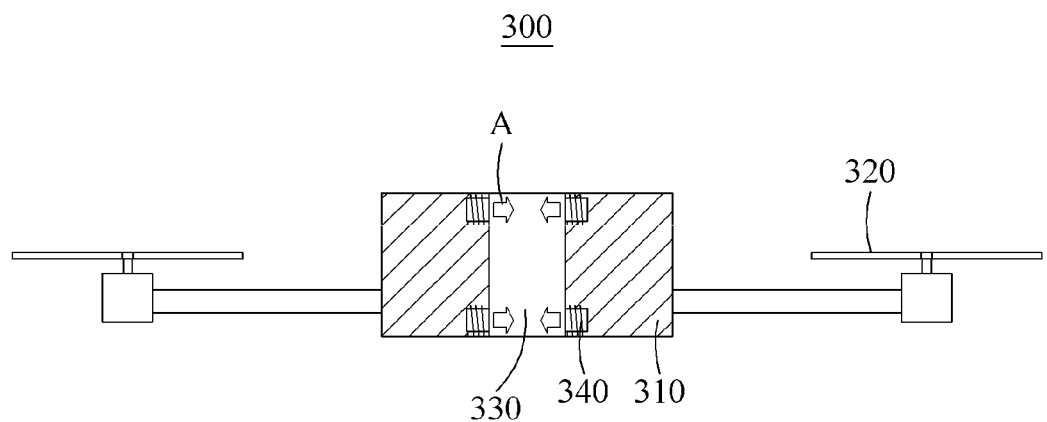
Figure 7:
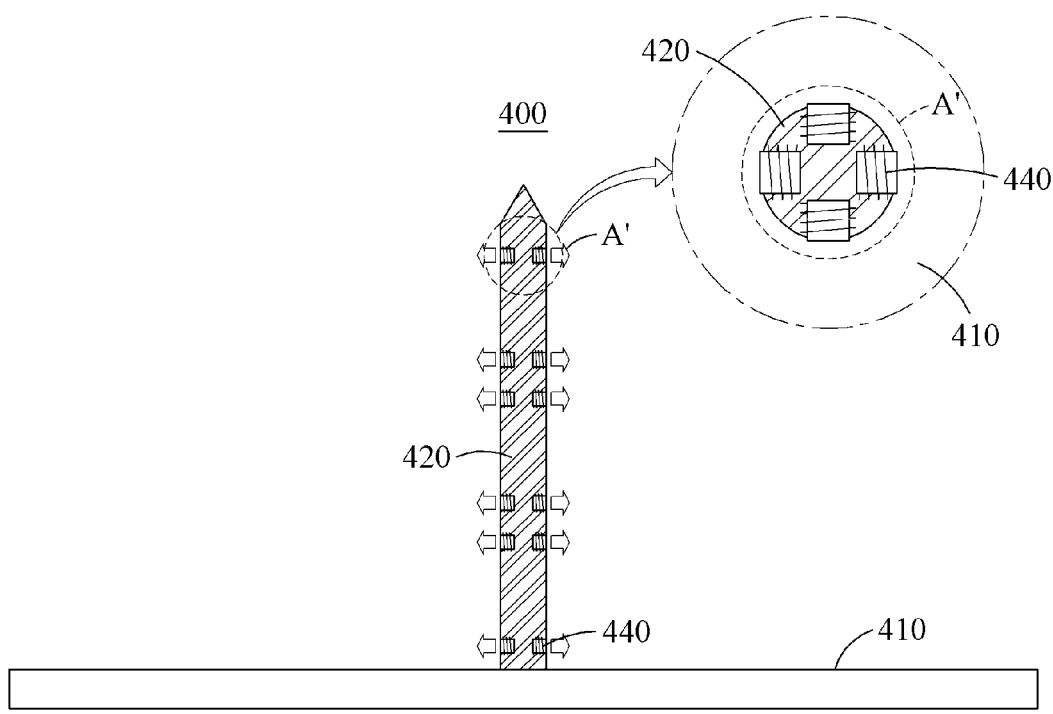
FIG. 7 illustrates a landing stand forming a radial magnetic field according to an example embodiment.
Figure 8A:
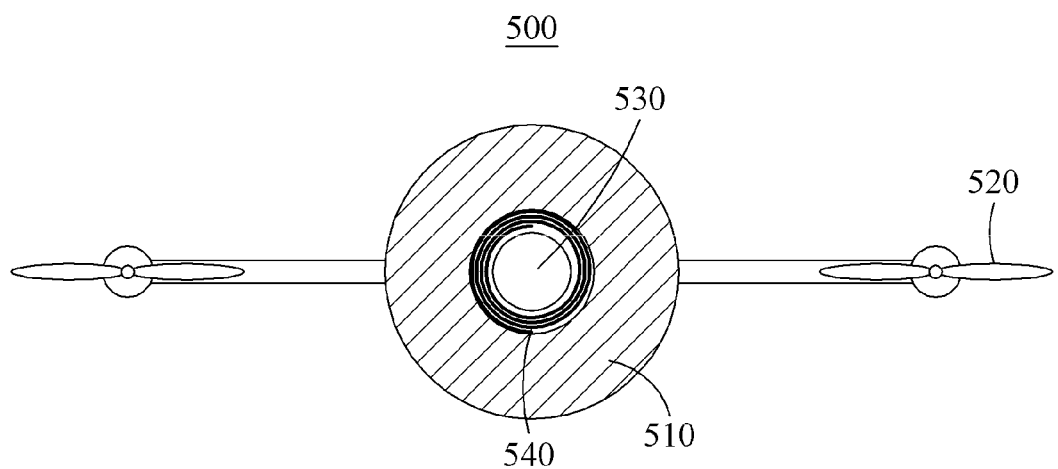
FIGS. 8*a* and 8*b* illustrate a drone forming an axial magnetic field according to an example embodiment.
Figure 8B:
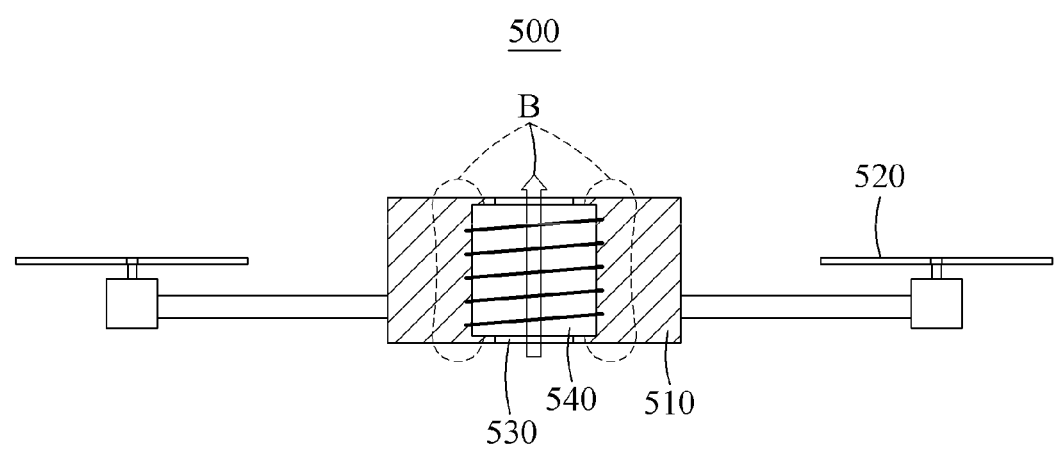
Figure 9:
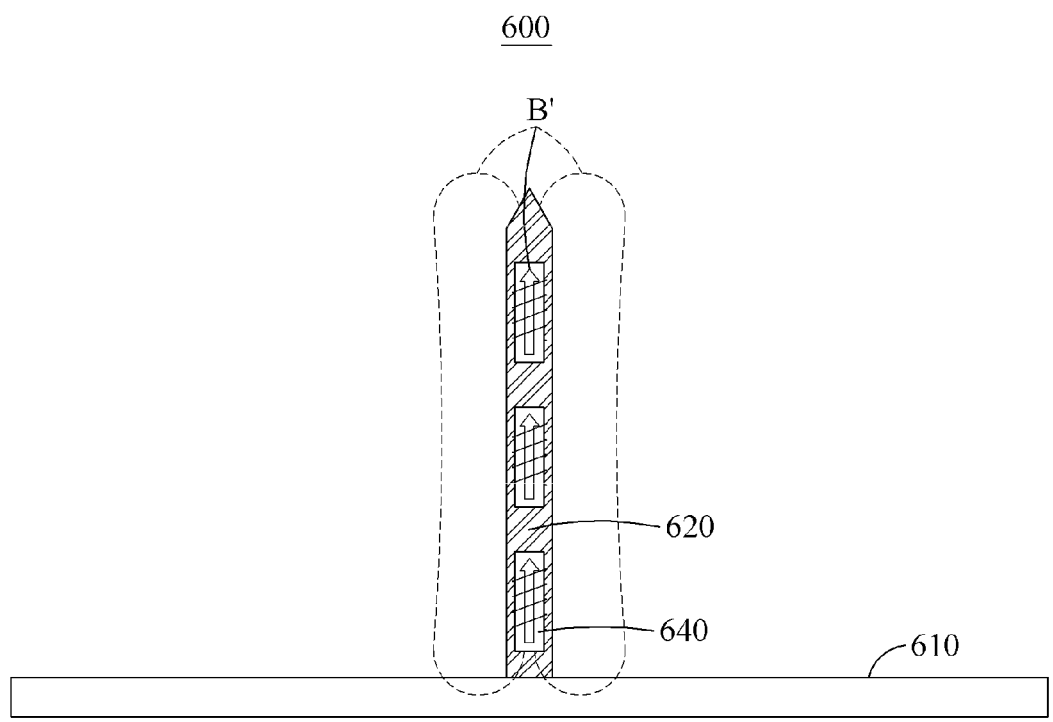
FIG. 9 illustrates a landing stand forming an axial magnetic field according to an example embodiment.
Figure 10:
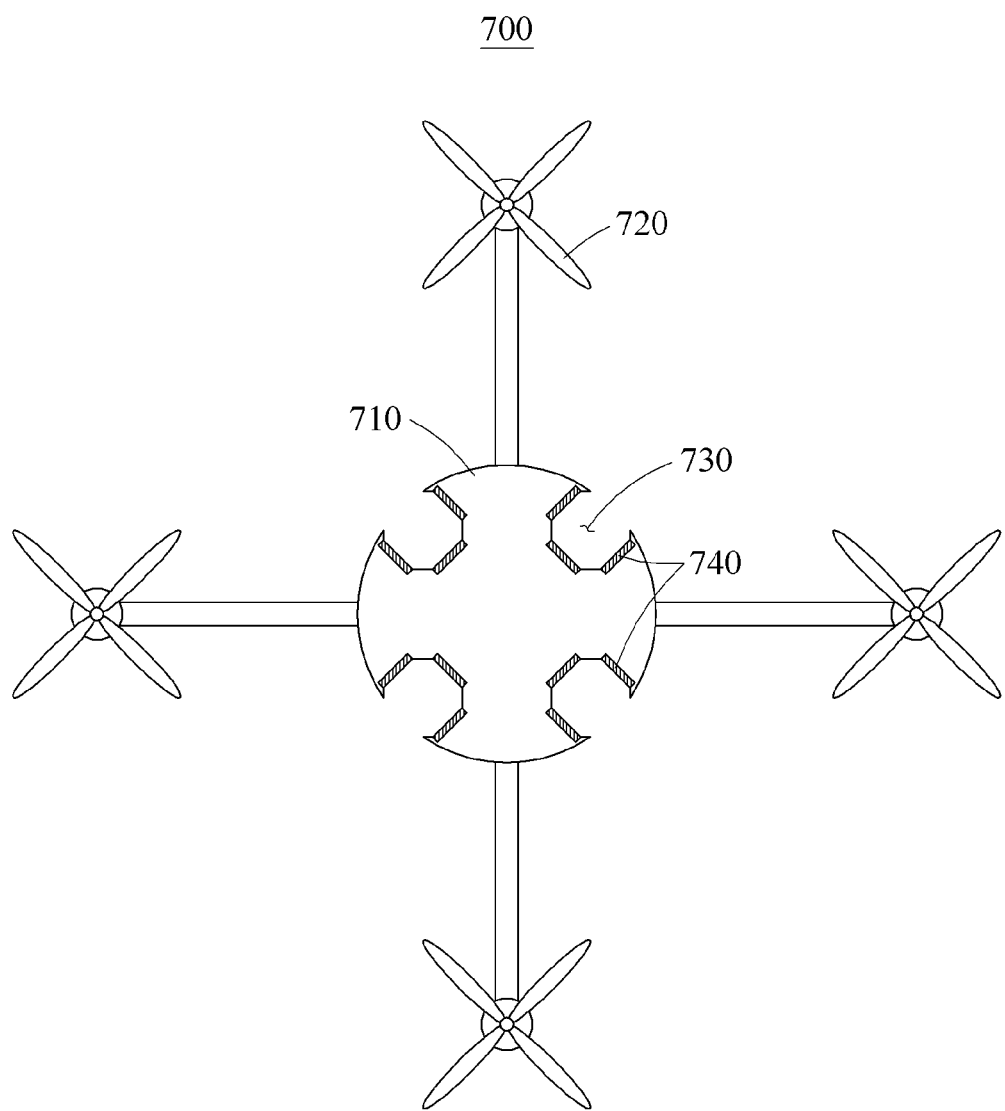
FIGS. 10 and 11 illustrate a drone according a modified example embodiment.
Figure 11:
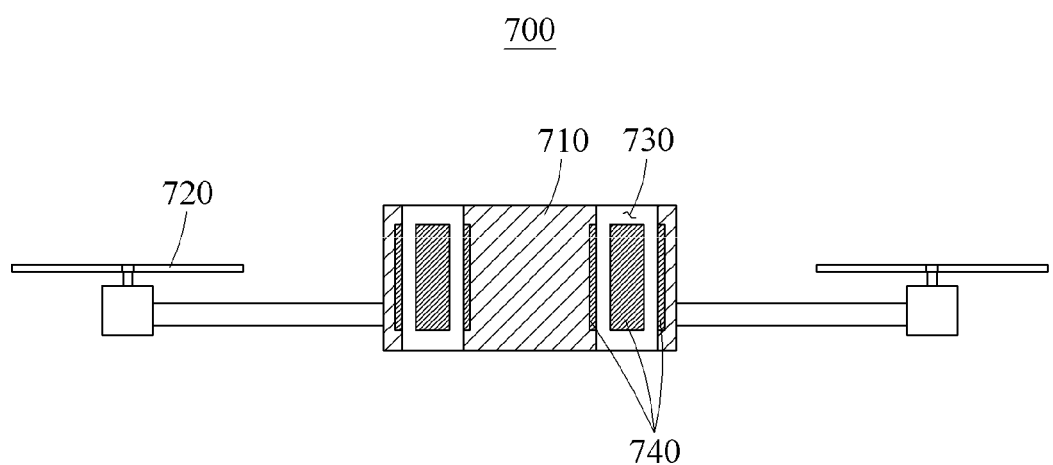
Figure 12:
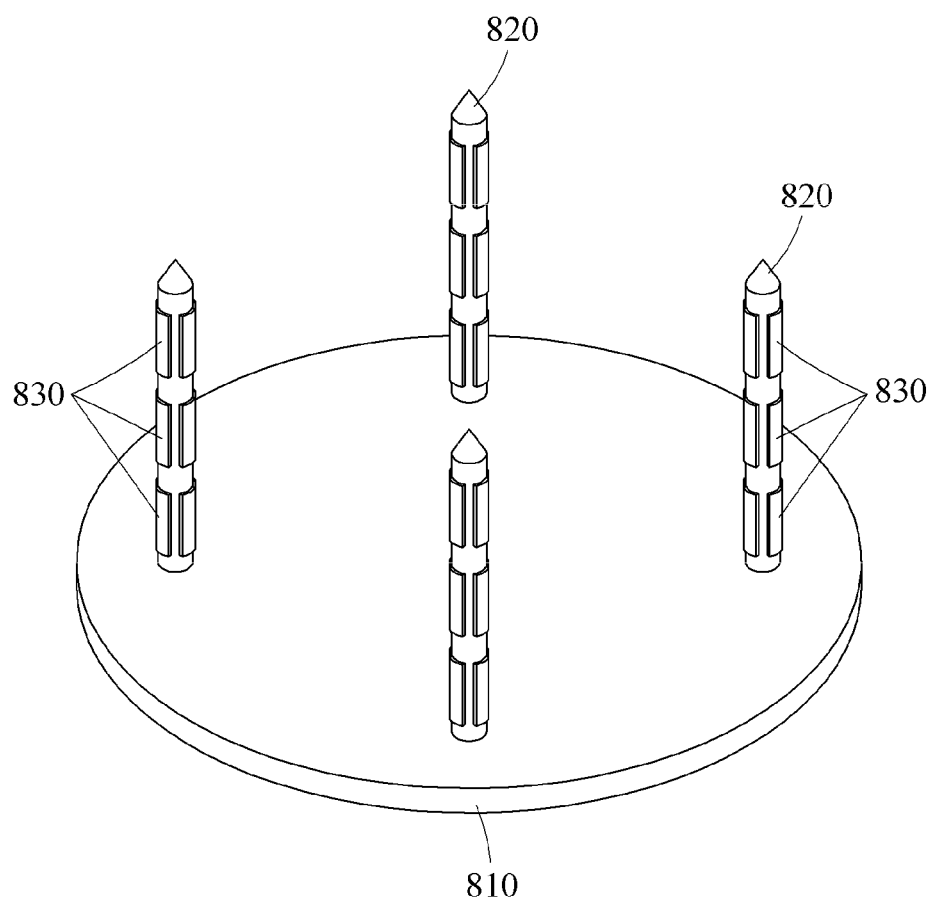
FIG. 12 illustrates a landing stand according a modified example embodiment.
Figure 13:
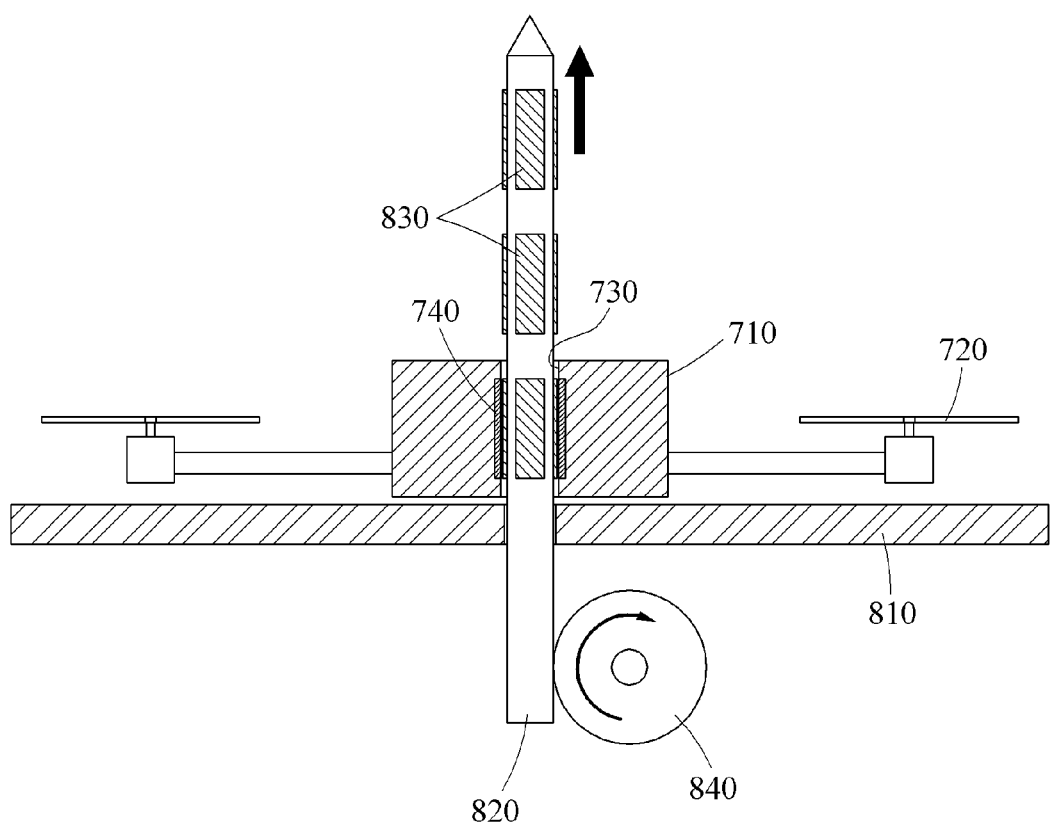
FIGS. 13 and 14 illustrate a drone takeoff and landing system according a modified example embodiment.
Figure 14:
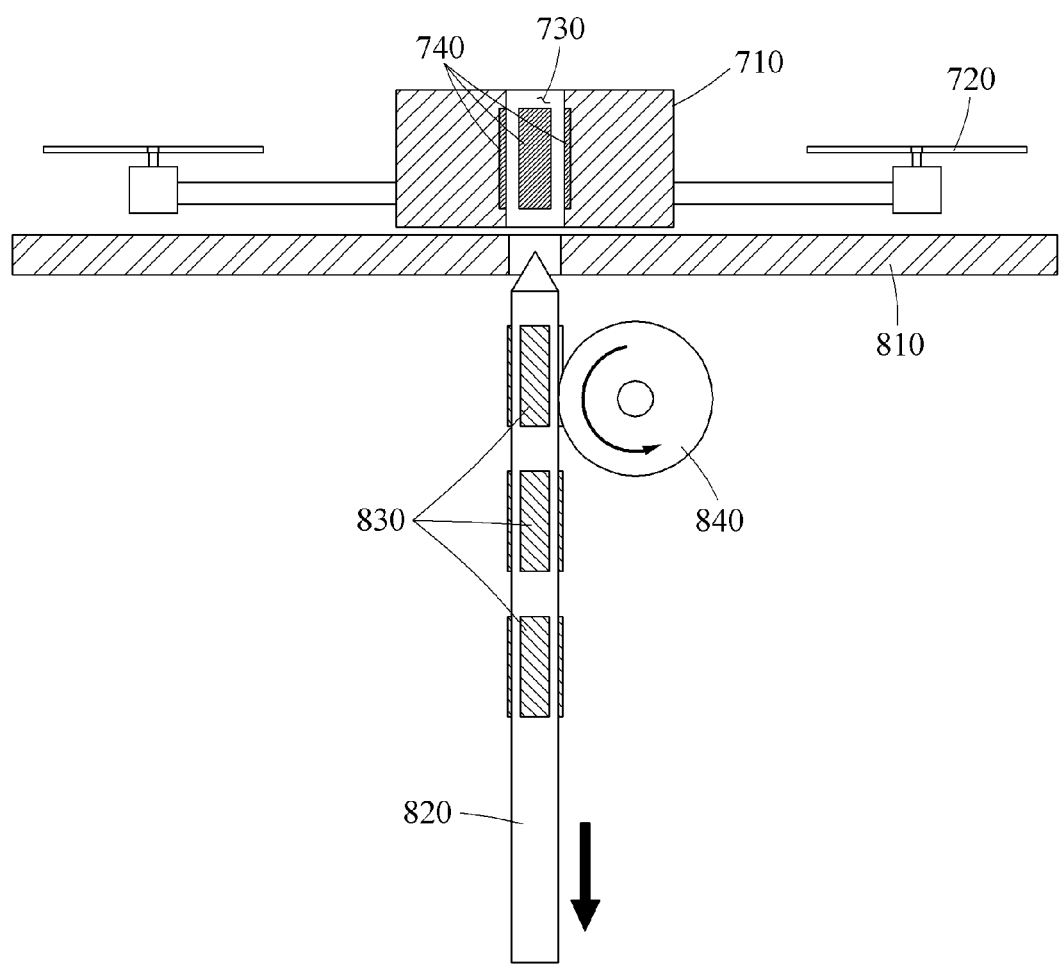

FIGS. 1*a* and 1*b* illustrate a drone according to an example embodiment. FIGS. 2*a* and 2*b* illustrate a landing stand according to an example embodiment. FIG. 3 illustrates a drone takeoff and landing system according to an example embodiment. FIGS. 4 and 5 illustrate a drone takeoff and landing system including a plurality of through-holes and a plurality of extension members according to an example embodiment. FIGS. 6*a* and 6*b* illustrate a drone forming a radial magnetic field according to an example embodiment. FIG. 7 illustrates a landing stand forming a radial magnetic field according to an example embodiment. FIGS. 8*a* and 8*b* illustrate a drone forming an axial magnetic field according to an example embodiment. FIG. 9 illustrates a landing stand forming an axial magnetic field according to an example embodiment. FIGS. 10 and 11 illustrate a drone according a modified example embodiment. FIG. 12 illustrates a landing stand according a modified example embodiment. FIGS. 13 and 14 illustrate a drone takeoff and landing system according a modified example embodiment. FIGS. 15*a* through 17*b* illustrate a landing module of a drone takeoff and landing system, and a drone to which the landing module is attached according to another example embodiment.

Referring to FIGS. 1*a* through 3, a drone takeoff and landing system 10 includes a drone 100 including a through-hole 130, and a landing stand 200 including an extension member 220 configured to pass through the through-hole 130 of the drone 100. When the extension member 220 of the landing stand 200 passes through the through-hole 130 of the drone 100, an eddy current may be generated between the through-hole 130 and the extension member 220, and thus magnetic braking may occur in the drone 100.

In detail, referring to FIGS. 1*a* and 1*b*, the drone 100 includes a main body 110, and a thruster 120 provided outside the main body 110. The through-hole 130 is formed in a portion of the main body 110 and configured to pass through the main body 110 from top to bottom. The through-hole 130 may be formed in a cylindrical shape. However, a shape of the through-hole 130 is not limited to the cylindrical shape, but a polygonal column shape such as a triangular prism shape and a rectangular column shape may also be applied as needed.

In addition, a magnetic body 140 is disposed on a surface of the through-hole 130 of the drone 100. Here, one or more magnetic bodies 140 may be disposed, separately from each other at regular intervals, on the surface of the through-hole 130. In addition, the magnetic body 140 may be formed to surround the entire surface of the through-hole 130.

Referring to FIGS. 2*a* and 2*b*, the landing stand 200 includes a landing pad 210, and the extension member 220 provided on one surface of the landing pad 210 and formed in a column shape. The extension member 220 may be formed in a cylindrical shape, and also in a polygonal column shape such as a triangular prism shape and a rectangular column shape as needed. The extension member 220 may be formed as a nonferrous conductor. In addition, a plurality of nonferrous conductor elements 240 may be additionally disposed on a surface of the extension member 220. As the nonferrous conductor, copper, lead, zinc, gold, platinum, mercury, silver, and the like may be used.

A cross-sectional area of the landing pad 210 may be set to be greater than an entire cross-sectional area of the drone 100 to be received by the landing stand 200. The landing stand 200 further includes a cover 230 provided on the landing pad 210 and configured to protect the drone 100 stacked on the landing stand 200. In such a case, the cover 230 may be closely connected to the landing pad 210 to seal or cover the drone 100 as a whole.

In addition, the cross-sectional area of the landing pad 210 may be set to be smaller than the entire cross-sectional area of the drone 100 to be received by the landing stand 200. In such a case, the cover 230 may be formed in an open type, and fixed to the landing stand 200 by a fixing element provided at an end of the extension member 220.

Referring to FIG. 3, the drone takeoff and landing system 10 includes a plurality of drones 100, and a length of the extension member 220 of the landing stand 200 is set to be longer than a total height of the drones 100. Thus, as the extension member 220 passes through through-holes 130 of the drones 100, the drones 100 may be sequentially stacked on the landing stand 200.

Thus, while the through-hole 130 of the drone 100 is passing through the extension member 220 of the landing stand 200, an eddy current may be generated between the magnetic body 140 disposed on the surface of the through-hole 130 of the drone 100 and the nonferrous conductor elements 240 disposed on the surface of the extension member 220 of the landing stand 200. The eddy current refers to a current, such as an alternating current, which is generated by electromagnetic induction of a conductor in a magnetic field that changes with time. A force generated by the eddy current may be used to generate a magnetic braking effect.

Thus, while the through-hole 130 of the drone 100 is passing through the extension member 220 of the landing stand 200, the magnetic braking effect may be generated by the eddy current, thereby preventing a collision between the drones 100 when they land. This may be maintained even when power of a drone is blocked.

In contrast to what has been described above, a nonferrous conductor element may be disposed on the surface of the through-hole 130 of the drone 100, and a magnetic body may be disposed on the surface of the extension member 220 of the landing stand 200. In such a case, while the through-hole 130 of the drone 100 is passing through the extension member 220 of the landing stand 200, an eddy current may be generated between the nonferrous conductor element disposed on the surface of the through-hole 130 of the drone 100 and the magnetic body disposed on the surface of the extension member 220 of the landing stand 200, and a force generated by the eddy current may be used to generate a magnetic braking effect.

Referring to FIGS. 4 and 5, a plurality of through-holes 130 is formed in the main body 110 of the drone 100. Here, the extension member 220 may be provided in a number corresponding to the number of the through holes 130 in the landing stand 200. In such case, an eddy current may be generated between the through-holes 130 and the extension members 220, and thus a greater magnetic braking effect may be generated, compared to a case in which a single through-hole and a single extension member are provided.

In the drone takeoff and landing system 10 including such components described above, the plurality of drones 100 may safely land on the landing stand 200. In addition, when the drones 100 are stacked on the landing stand 200, the drone takeoff and landing system 10 may mount the cover 230 on the landing stand 200, and use it as a means to safely keep and transport the drones 100 stacked.

Referring to FIGS. 6a through 9, a drone takeoff and landing system according to an example embodiment includes a drone (300, 500) including a through-hole (330, 530), and a landing stand (400, 600) including an extension member (420, 620) configured to pass through the through-hole (330, 530). A first electromagnet (340, 540) is disposed in the through-hole (330, 530), and a second electromagnet (440, 640) is disposed in the extension member (420, 620). Here, a magnetic field of the first electromagnet (340, 540) and the second electromagnet (440, 640) is controlled in order to control a takeoff or landing speed of the drone (300, 500) or wirelessly charge the drone (300, 500). Here, an electromagnet may be, for example, a solenoid formed by winding a coil on a cylindrical iron core. When a current passes through the coil wound in a cylindrical shape, a magnetic field may be formed. In addition, when the iron core is inserted therein, a stronger magnetic field may be obtained. However, examples are not limited to the foregoing, and an electromagnet that may be devised by those skilled in art may also be used.

In detail, referring to FIGS. 6a and 6b, the drone 300 includes a main body 310 and a thruster 320 provided outside the main body 310. The through-hole 330 configured to pass through the main body 310 from top to bottom is formed in a portion of the main body 310. In addition, the first electromagnet 340 is disposed on a surface of the through-hole 330 of the drone 300 to form a radial magnetic field in a direction A vertical to a length direction of the through-hole 330.

In addition, referring to FIG. 7, the landing stand 400 includes a landing pad 410 and the extension member 420 provided on one surface of the landing pad 410 and having a column shape. The second electromagnet 440 is disposed on a surface of the extension member 420 of the landing stand 400 to form a radial magnetic field in a direction A' vertical to a length direction of the extension member 420.

The drone takeoff and landing system including the drone 300 and the landing stand 400 as described above may drive electromagnets to control a takeoff or landing speed of the drone 300.

That is, while the through-hole 330 of the drone 300 is passing through the extension member 420 of the landing stand 400 for the drone 300 to make a landing on the landing stand 400, the first electromagnet 340 and the second electromagnet 440 may be controlled to have a same polarity, and thus a repulsive force may be generated between the first electromagnet 340 and the second electromagnet 440. Thus, it is possible to decrease the landing speed of the drone 300 when the drone 300 lands on the landing stand 400.

In addition, using the same principle, when the drone 300 is taking off from the landing stand 400, the first electromagnet 340 and the second electromagnet 440 may be controlled to have a same polarity, and thus a repulsive force may be generated between the first electromagnet 340 and the second electromagnet 440. Thus, it is possible to increase the takeoff speed of the drone 300.

In addition, it is possible to wirelessly charge the drone 300 by magnetic induction between the first electromagnet 340 and the second electromagnet 440.

Referring to FIGS. 8a and 8b, the drone 500 includes a main body 510 and a thruster 520 provided outside the main body 510, and a through-hole 530 configured to pass through the main body 510 from top to bottom is formed in a portion of the main body 510. In addition, the first electromagnet 540 is disposed on the surface of the through-hole 530 of the drone 500 to form an axial magnetic field in a direction B horizontal to a length direction of the through-hole 530.

In addition, referring to FIG. 9, the landing stand 600 includes a landing pad 610 and an extension member 620 provided on one surface of the landing pad 610 and having a column shape. The second electromagnet 640 is disposed on the surface of the extension member 620 of the landing stand 600 to form an axial magnetic field in a direction B' vertical to a length direction of the extension member 620.

The drone takeoff and landing system including the drone 500 and the landing stand 600 as described above may drive electromagnets while the drone 500 is resting on the landing stand 600 after being docked thereon, and thus generate magnetic induction between the first electromagnet 540 and the second electromagnet 640 to wirelessly charge the drone 500 by the magnetic induction. In addition, the drone takeoff and landing system may drive the electromagnets to control a takeoff or landing speed of the drone 500 as described above.

The drone takeoff and landing system as described above may generate an eddy current when a drone lands on a landing stand, thereby preventing a collision between a plurality of drones, and further preventing a collision between the drones even when power of a drone is blocked, without being affected by such blockage.

In addition, the drone takeoff and landing system may accommodate a plurality of drones, and facilitate takeoff, landing, and transportation of the drones.

In addition, the drone takeoff and landing system may adjust a takeoff or landing speed of a drone, and thus enable the drone to take off fast from a landing stand and softly land on the landing stand, and also enable the drone to be wirelessly charged while the drone is resting on the landing stand.

Referring to FIGS. 10 through 12, according to a modified example embodiment, a drone takeoff and landing system includes a drone 700 including a through-hole 730, and a landing stand 800 including a landing pad 810 and an extension member 820 provided on one surface of the landing pad 810 and configured to pass through the through-hole 730 of the drone 700. When the extension member 820 of the landing stand 800 passes through the through-hole 730 of the drone 700, an eddy current or a magnetic field may be generated between the through-hole 730 and the extension member 820 to control a speed of the drone 700 or wirelessly charge the drone 700.

In detail, referring to FIGS. 10 and 11, the drone 700 includes a main body 710, and a thruster 720 provided outside the main body 710. In addition, the through-hole 730 is formed on a side surface of the main body 710 of the drone 700 such that one surface of the through-hole 730 is opened in a direction towards an outside of the main body 710. Here, the through-hole 730 may be formed in a cylindrical shape. However, a shape of the through-hole 730 is not limited to the cylindrical shape, but a polygonal column shape such as a triangular prism shape and a rectangular column shape may also be applied as needed. Here, one or more through-holes may be formed as the through-hole 730 in the drone 700.

A magnetic body 740 is disposed in the through-hole 730 of the drone 700. For example, the magnetic body 740 is provided on a surface of the through-hole 730. In this example, one or more magnetic bodies 740 are disposed, separately from each other at regular intervals, on the surface of the through-hole 730. In addition, the magnetic body 740 may also be formed to surround the entire surface of the through-hole 730. Here, a magnetic body may be replaced with an electromagnet.

Referring to FIG. 12, the landing stand 800 includes a landing pad 810, and an extension member 820 provided on one surface of the landing pad 810 and having a column shape. Here, the extension member 820 may be formed in a cylindrical shape, and formed also in a polygonal column shape such as a triangular prism shape and a rectangular column shape as needed. A nonferrous conductor is disposed in the extension member 820. For example, the extension member 820 itself is formed as the nonferrous conductor. A plurality of nonferrous conductor elements 830 are additionally disposed on a surface of the extension member 820. As the nonferrous conductor, copper, lead, zinc, gold, platinum, mercury, silver, and the like may be used. Here, the extension member 820 is provided in a number corresponding to the number of through-holes 730 formed in the drone 700.

Referring to FIGS. 13 and 14, the extension member 820 of the landing stand 800 moves vertically with respect to the landing pad 810. When the drone 700 lands, the extension member 820 moves upwards. When the drone 700 takes off, the extension member 820 moves downwards.

In detail, referring to FIG. 13, when the drone 700 is to land on the landing stand 800, the extension member 820 moves upwards from the landing pad 810 by a control member 840 provided below the landing pad 810. Thus, when the extension member 820 passes through the through-hole 730 of the drone 700, an eddy current may be generated between the through-hole 730 and the extension member 820 to enable magnetic braking or wireless charging of the drone 700.

That is, while through-hole 730 of the drone 700 is passing through the extension member 820 of the landing stand 800, the eddy current may be generated between the magnetic body 740 disposed in the through-hole 730 of the drone 700 and the nonferrous conductor disposed in the extension member 820 of the landing stand 800. Here, the eddy current refers to a current, such as an alternating current, which is generated by electromagnetic induction of a conductor in a magnetic field that changes with time. A force generated by the eddy current may be used to generate a magnetic braking effect.

Thus, while the through-hole 730 of the drone 700 is passing through the extension member 820 of the landing stand 800, the magnetic braking effect may be generated by the eddy current, thereby decreasing a landing speed of the drone 700 when it lands although it is in a non-powered state.

In addition, when the drone 700 is resting on the landing stand 800, the drone 700 may be charged wirelessly.

Referring to FIG. 14, when the drone 700 is to take off from the landing stand 800, the extension member 820 moves downwards from the landing pad 810 by the control member 840 provided below the landing pad 810. Thus, when the drone 700 takes off, it is possible to eliminate a decrease in takeoff speed by the eddy current generated between the through-hole 730 and the extension member 820. Thus, through such an operation, when a drone does not take off or land, or the drone is not wirelessly charged, it is possible to safely keep the extension member 820 from an external environment by disposing the extension member 820 below the landing pad 810.

In contrast to what has been described above, a nonferrous conductor is disposed on the surface of the through-hole 730 of the drone 700, and a magnetic body or an electromagnet is disposed on the extension member 820 of the landing stand 800. In such a case, while the through-hole 730 of the drone 700 is passing through the extension member 820 of the landing stand 800, an eddy current may be generated between the nonferrous conductor disposed in the through-hole 730 of the drone 700 and the magnetic body or the electromagnet disposed in the extension member 820 of the landing stand 800. Here, a force generated by the eddy current may generate a magnetic braking effect or be used to wirelessly charge the drone 700.

In addition, a first electromagnet is disposed in the through-hole 730 of the drone 700, and a second electromagnet is disposed in the extension member 820, and a magnetic field of the first electromagnet and the second electromagnet may be controlled to control a takeoff or landing speed of the drone 700 or wirelessly charge the drone 700.

Here, an electromagnet may be, for example, a solenoid formed by winding a coil on a cylindrical iron core. When a current passes through the coil wound in a cylindrical shape, a magnetic field may be formed. In addition, when the iron core is inserted therein, a stronger magnetic field may be obtained. However, examples are not limited to the foregoing, an electromagnet that is devised by those skilled in art may also be used.

As described above, it is possible to adjust a takeoff or landing speed of the drone 700 by driving the electromagnets.

That is, while the through-hole 730 of the drone 700 is passing through the extension member 820 of the landing stand 800 for the drone 700 to land on the landing stand 800, a polarity of the first electromagnet and the second electromagnet may be controlled to generate an attractive force or a repulsive force between the first electromagnet and the second electromagnet. Thus, when the drone 700 lands on the landing stand 800, it is possible to decrease the landing speed of the drone 700.

In addition, using the same principle, when the drone 700 is taking off from the landing stand 800, a polarity of the first electromagnet and the second electromagnet may be controlled to generate an attractive force or a repulsive force between the first electromagnet and the second electromagnet. Thus, it is possible to increase the takeoff speed of the drone 700.

In addition, it is possible to wirelessly charge the drone 700 by magnetic induction between the first electromagnet and the second electromagnet.

Referring to FIGS. 15a through 17b, a drone takeoff and landing system according to another example embodiment includes a landing module 900 attachable to and detachable from the drone 700 and including a through-hole 911, and a landing stand including a landing pad and an extension member provided on one surface of the landing pad and configured to pass through the through-hole 911 of the landing module 900.

Figure 15A:
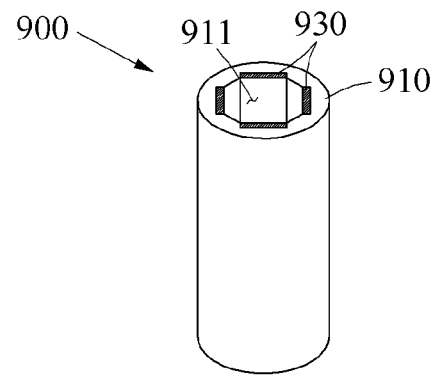
FIGS. 15*a* through 17*b* illustrate a landing module of a drone takeoff and landing system, and a drone to which the landing module is attached according to another example embodiment.

In detail, as illustrated FIG. 15a, the landing module 900 includes a pass-through member 910 in which the through-hole 911 is formed, and a magnetic body 930 disposed in the through-hole 911. Here, a magnetic body may be replaced with an electromagnet.

Figure 15B:
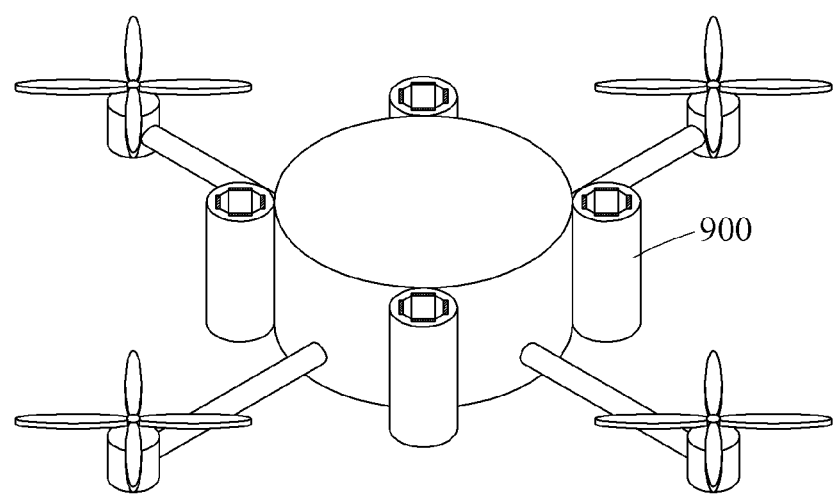

As illustrated in FIG. 15b, the landing module 900 may be directly attachable to or detachable from a portion of the main body 710 of the drone 700 which is an existing drone without a through-hole. For example, the landing module 900 is attachable directly to a side surface of the main body 710 of the drone 700. In this example, a connecting loop or a screw tightener may be used to connect the landing module 900 and the main body 710.

Figure 16A:
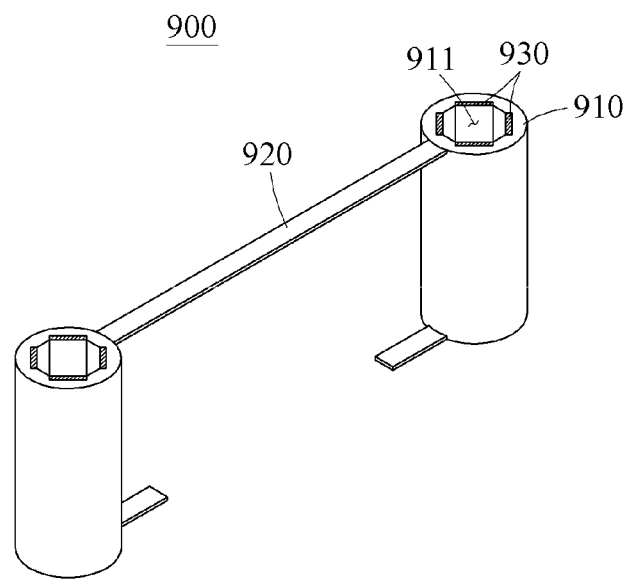
Figure 17A:
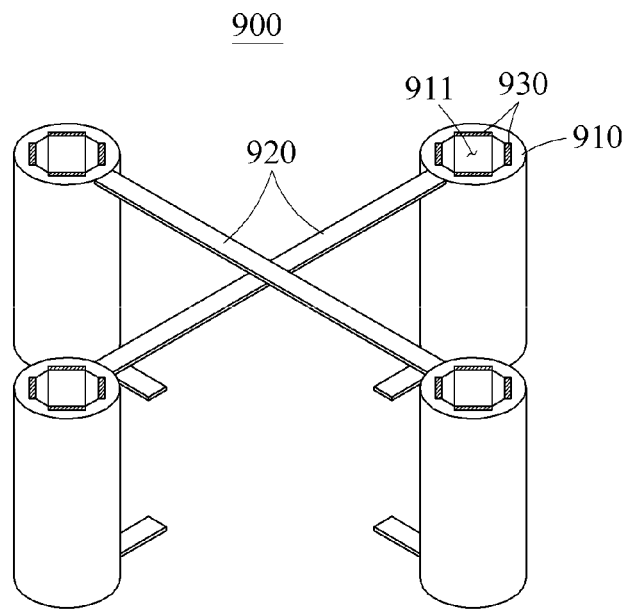

In addition, as illustrated in FIGS. 16a and 17a, the landing module 900 includes a plurality of pass-through members 910, and a connection member 920 configured to connect the pass-through members 910 and attachable to and detachable from the drone 700.

Figure 16B:
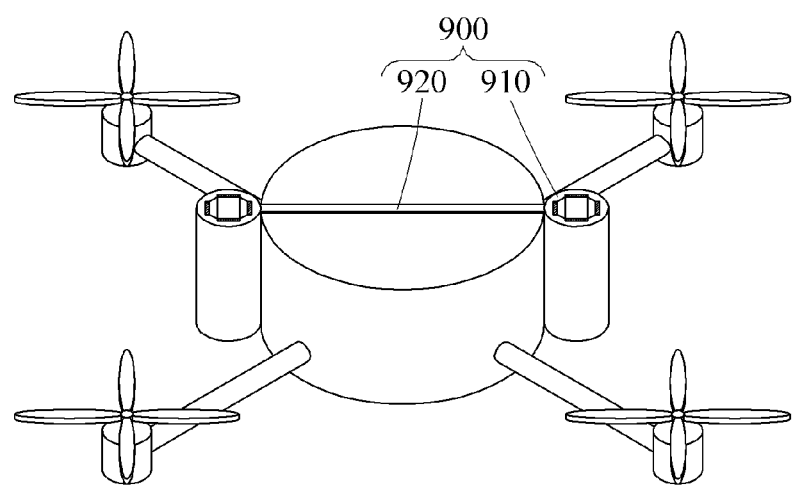
Figure 17B:
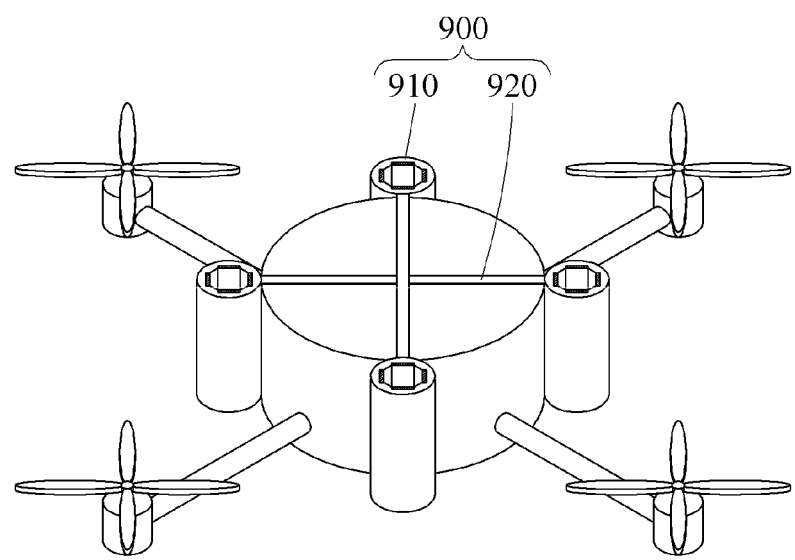

The connection member 920 is formed of an elastic material, and thus a length thereof may be adjustable. The length of the connection member 920 may increase to be greater than a width of the main body 710, and then decrease again when the pass-through member 910 is disposed on the side surface of the main body 710. Thus, as illustrated in FIGS. 16b and 17b, it is possible to stably fix the pass-through member 910 to the side surface of the main body 710.

The length of the connection member 920 may also be adjustable through screw tightening. That is, the length of the connection member 920 may be fundamentally set to be longer than the width of the main body 710, and then be reduced through screw tightening when the pass-through member 910 is disposed on the side surface of the main body 710. Thus, as illustrated in FIGS. 16b and 17b, it is possible to stably fix the pass-through member 910 to the side surface of the main body 710.

Thus, in a case in which the landing module 900 is attached to the drone 700, an eddy current may be generated between the magnetic body 930 disposed in the through-hole 911 of the landing module 900 and a nonferrous conductor disposed in the extension member of the landing pad when the extension member of the landing pad passes through the through-hole 911 of the landing module 900, and thus magnetic braking or wireless charging may occur in the drone 700.

In contrast to what has been described above, a nonferrous conductor is disposed in the through-hole 911 of the landing module 900, and a magnetic body or an electromagnet is disposed in the extension member of the landing stand.

In addition, a first electromagnet is disposed in the through-hole 911 of the landing module 900, and a second electromagnet is disposed in the extension member of the landing pad. Thus, in a case in which the landing module 900 is attached to the drone 700, a magnetic field may be generated between the first electromagnet of the landing module 900 and the second electromagnet of the landing pad. Thus, by controlling the magnetic field, it is possible to control a takeoff or landing speed of the drone 700, or wirelessly charge the drone 700.

A drone takeoff and landing system according to a modified example embodiment as described above may generate an eddy current or a magnetic field between a drone and a landing stand and adjust a takeoff or landing speed of the drone, and thus enable the drone to make a fast takeoff from the landing stand and a soft landing on the landing stand.

A drone takeoff and landing system according to a modified example embodiment as described above may generate an eddy current or a magnetic field between a drone and a landing stand, and thus enable the drone to be wirelessly charged when the drone rests on the landing stand.

A drone takeoff and landing system according to another example embodiment as described above may include a landing module attachable to or detachable from an existing drone, and a landing stand, and thus generate same effects described above for the existing drone of which a main body does not include a through-hole.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A drone takeoff-and-landing system, comprising: a drone including a through-hole and a landing stand including a landing pad and an extension member provided on one surface of the landing pad and configured to pass through the through-hole, wherein
the through-hole is formed on a side surface of a main body of the drone such that one surface of the through-hole is opened in a direction towards an outside of the main body,
the extension member of the landing stand is configured to move vertically from the landing pad and configured to move selectively upwards or downwards when the drone takes off or lands, and
when the extension member passes through the through-hole of the drone, an eddy current is generated between the through-hole and the extension member and magnetic braking or wireless charging occurs in the drone.

2. The drone takeoff-and-landing system of claim 1, wherein the through-hole is one of a plurality of through-holes and wherein the extension member is one of a plurality of extension members.

3. The drone takeoff-and-landing system of claim 1, wherein a magnetic body or an electromagnet is disposed in the through-hole, wherein a nonferrous conductor is disposed in the extension member, and wherein the eddy current is generated between the magnetic body or the electromagnet and the nonferrous conductor.

4. The drone takeoff-and-landing system of claim 1, wherein a nonferrous conductor is disposed in the through-hole, wherein a magnetic body or an electromagnet is disposed in the extension member, and wherein the eddy current is generated between the magnetic body or the electromagnet, and the nonferrous conductor.

5. The drone takeoff-and-landing system of claim 1, wherein a first electromagnet is disposed in the through-hole, wherein a second electromagnet is disposed in the extension member, and wherein a magnetic field of the first electromagnet and the second electromagnet is controlled to control a takeoff or landing speed of the drone or wirelessly charge the drone.

6. A drone takeoff-and-landing system comprising:
a landing module attachable to or detachable from a drone and including a through-hole and
a landing stand including a landing pad and an extension member provided on one surface of the landing pad and configured to pass through the through-hole,
wherein, in a case in which the landing module is attached to the drone, an eddy current or a magnetic field is generated between the through-hole and the extension member when the extension member passes through the through-hole to control a speed of the drone or wirelessly charge the drone,
wherein the landing module includes: a plurality of pass-through members, each of which includes a through-hole, and a connection member configured to connect the pass-through members and to be attachable to and detachable from the drone, and
wherein the connection member is formed of an elastic material such that a length thereof is adjustable or a length of the connection member is adjustable through screw tightening.

7. The drone takeoff-and-landing system of claim 6, wherein a magnetic body or an electromagnet is disposed in one of the through-hole and the extension member and a nonferrous conductor is disposed in the other, wherein the eddy current is generated between the magnetic body or the electromagnet and the nonferrous conductor, and wherein the magnetic braking or wireless charging occurs in the drone.

8. The drone takeoff-and-landing system of claim 6, wherein a first electromagnet is disposed in the through-hole, wherein a second electromagnet is disposed in the extension member, and wherein a magnetic field of the first electromagnet and the second electromagnet is controlled to control a takeoff or landing speed of the drone or to wirelessly charge the drone.

* * * * *